United States Patent [19] // Ramirez

[11] 4,350,087

[45] Sep. 21, 1982

[54] JUICER HAVING IMPROVED BALANCE

[76] Inventor: Justo D. Ramirez, Calle-Garibaldi #1385 S.H., Guadalajara, Jalisco, Mexico

[21] Appl. No.: 245,869

[22] Filed: Mar. 20, 1981

[30] Foreign Application Priority Data

Mar. 26, 1981 [MX] Mexico .................................. 181717

[51] Int. Cl.[3] ............................................... A23N 1/02

[52] U.S. Cl. ........................................ 99/511; 99/513

[58] Field of Search .................. 99/495, 503, 509-513; 233/7; 241/78 R, 74, 99.3; 210/173, 174, 360.2

[56] References Cited

U.S. PATENT DOCUMENTS 3,085,606 4/1963 Moline .
3,086,570 4/1963 Austad .
3,100,009 8/1963 Drachenberg ........................ 99/511
3,534,793 10/1970 Wunderlin ............................ 99/511

*Primary Examiner*—Philip R. Coe
*Assistant Examiner*—Timothy F. Simone
*Attorney, Agent, or Firm*—Beveridge, DeGrandi & Kline

[57] ABSTRACT

A juicer having a positively rotated cutting disk for comminuting the product to be juiced is disclosed. A centrifuging disk is mounted on the same spindle as the cutting disk, but via ball bearings so that it rotates independently of the cutting disk. The centrifuging disk supports a basket which collects and centrifuges the pulp of the comminuted product. Since the basket and the cutting disk rotate at different speeds, the pulp is evenly distributed around the basket, minimizing vibration and increasing the yield. Juice drains off a depending wall of the cutting disk into an annular groove in the centrifuging disk and then out radial channels. The rotational speed of the centrifuging disk is retarded by fins which interact with the cooling air for the motor. According to the invention, the basket rotates at a somewhat slower speed than does the cutter disk and the pulp accumulated on the basket walls will be less dense as compared with an apparatus where the basket rotates at a higher speed than the cutter. Therefore this will permit the juice to pass through the pulp more easily and thereby increase the yield.

4 Claims, 4 Drawing Figures

130 128 158 120 138 140 150 148 146 142 144 162 160 156 166 164 134 122 152 154 126 132 106 108 118 116 124 112 114 112 114 110 104 102 116 100

JUICER HAVING IMPROVED BALANCE

BACKGROUND OF THE INVENTION

This invention relates to juicers and more particularly to a juicer having an improved construction to decrease vibration by increasing the balance of the device and to yield a greater quantity of juice from a given product input quantity.

In the past, it has been known to provide a juicer having a rotating cutting disk by which products such as vegetables or fruits are comminuted. During such comminution, the juice of the product is liberated and the solid portions of the product are reduced to a pulp. Typically, a basket or foraminous container is provided outwardly of the rotating cutting disk which, by the action of centrifugal force acting on the juice and pulp, receives the juice and pulp from the cutting disk. The pulp is retained in the basket as the juice is passed outwardly for collection.

The cutting disk generally has a plurality of upstanding blades which effect the comminution of the product. It has been found that if one of the blades becomes damaged, then a lesser quantity of pulp will be thrown outwardly from that radial portion of the cutting disk. In such a condition, the distribution of the pulp in the basket is not uniform, so that the rotation of the basket is attended with a great deal of vibration, noise, and perhaps even danger to the operator of the device.

There have been past attempts to remedy this problem, such as the devices disclosed in U.S. Pat. No. 3,085,606 to Moline and U.S. Pat. No. 3,100,009 to Drachenberg. In the Moline device, the basket is positively rotated, with the cutter disk frictionally engaging the basket. Thus, the resistance imposed on the cutting disk by the introduced product causes it to slow down relative to the basket, resulting in a relative angular velocity between the cutting disk and the basket. In the Drachenberg device, the cutting blade is positively driven and a plate underlying the basket has pawl elements which drive the basket for rotation. When a product is presented to the cutting blade for comminution, the drag imposed on the cutting disk causes it to slow down, however, the basket maintains its original rotational speed and tends to overrun the cutting blade. Thus in both the Moline and Drachenberg devices the differential rotational speed is achieved only when a product is actually being presented to the cutting blade and in both cases, the basket has a higher rotational speed than the cutting blade.

It will be apparent that some bits of the pulp will temporarily adhere to a blade even when a product is not being forced against it. In both the Moline and Drachenberg cases, if a product is not being presented, but the temporarily adhered pulp releases itself under the centrifugal force, then it will radiate out to the basket. Over a period of time, an imbalance can still develop, resulting in unnecessary noise and vibration.

It has been known in the past to provide fins on the bottom of the rotating plate supporting the basket. The fins, in combination with holes in the housing for the motor have tended to cause an air flow through that housing to cool the motor. It is believed, however, that such use of the fins has been strictly limited to juicers in which the basket supporting the plate is mounted for rotation at the same speed as the cutter disk.

Thus, it can be seen that there is a need in the art for a juicer in which the basket is constantly driven at a different speed than the cutter blade so that even temporarily adhering pulp will be distributed evenly around the basket when it is eventually released from the cutter blades. Furthermore, there is need for a simple construction of a juicer which provides long life by generating air currents through the motor and yet advantageously, putting such air current to use by controlling the rate of rotation of the basket with respect to the cutter blade.

SUMMARY OF THE INVENTION

The present invention fulfills these needs by providing a juicer for separating a liquid portion of a product from its solid portions including a base, a motor means mounted on the base for rotating a spindle, a cutting disk rigidly mounted on the spindle for positive rotation thereby, means for introducing the product to be juiced to the cutting disk, a centrifuging disk mounted for independent rotation on the spindle between the motor and the cutting disk by means of ballbearings on the spindle, means mounted on the centrifuging disk for retaining the solid portions of the product and for allowing the liquid portion to pass radially outwardly, and a collection means surrounding the retaining means for collecting the liquid portion, whereby the motor means can rotate the cutting disk and the friction of the ballbearings will cause the centrifuging disk to rotate at a rotational speed different from that of the cutting disk to result in a relative rotational speed between the cutting disk and the centrifuging disk.

Preferably the juicer has two ballbearings to mount the centrifuging disk to increase the frictional engagement of the centrifuging disk with the spindle.

Additionally, the cutting disk can have a cylindically shaped wall depending from its outer circumference, and the centrifuging disk can have an annular groove in its top surface into which the depending wall of the cutting disk loosely fits and channels radiating from the annular groove to the outer circumference of the centrifuging disk, so that the liquid portion of the product can travel from the cutting disk to the annular groove and then the radiating channels of the centrifuging disk.

Still more preferably, the base has side walls and a top wall encasing the motor means, the top wall having the spindle passing therethrough, air entry means in the side walls and air discharge means in the top wall near the spindle, and the centrifuging disk has fins mounted on its bottom, so that air can pass through the base from the air entry means to the air discharge means and pass radially outward therefrom between the top of the base and the centrifuging disk, so that the radially moving air engages the fins to retard the rotational speed of the centrifuging disk.

BRIEF DESCRIPTION OF THE DRAWING

The invention will be better understood by a reading of the detailed description and a study of the drawing in which.

Figure 1:
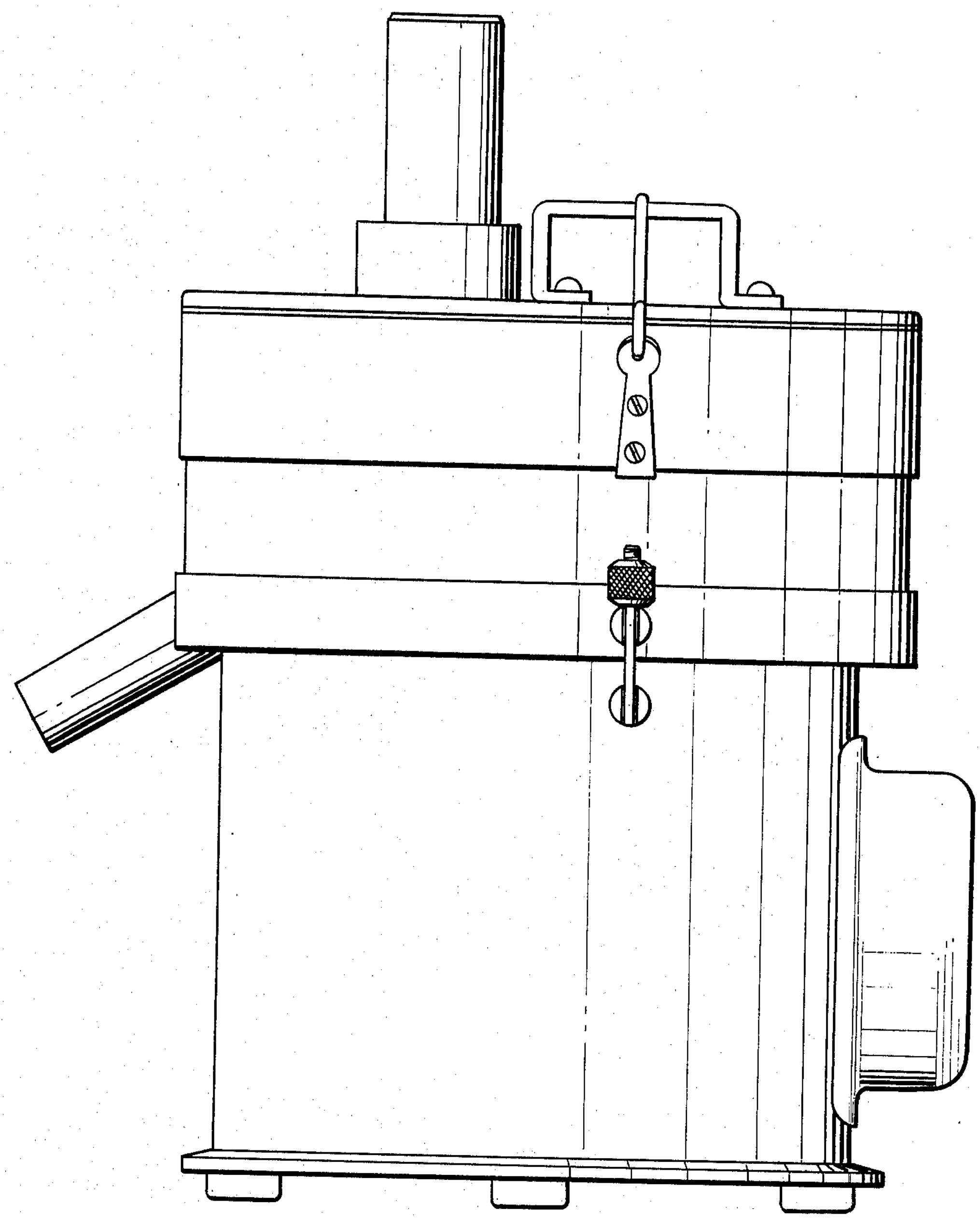
FIG. 1 is a view of the conventional appearance of a juicer.
Figure 2:
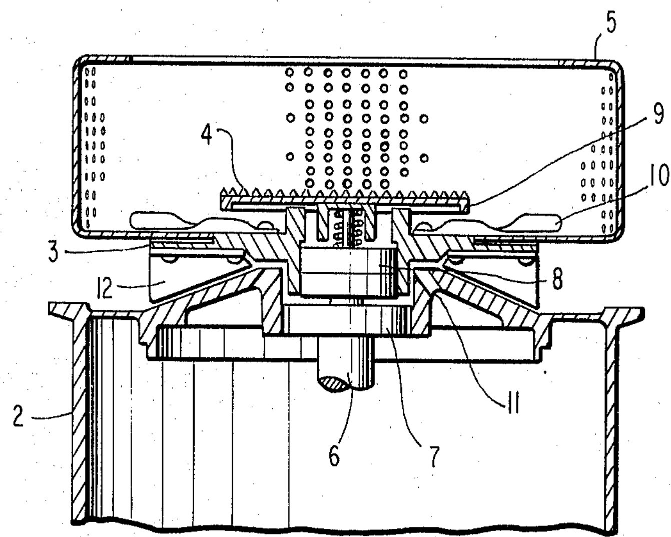
FIG. 2 is a cross-section of a juicer, in which the improvement of one embodiment of the invention can be seen.
Figure 3:
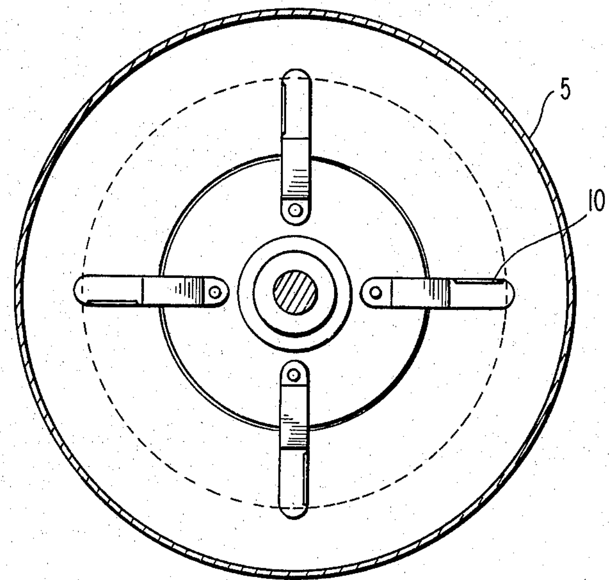
FIG. 3 is a top view of the juicer clearly showing the springs for fastening the basket to facilitate the dismounting of same.

Briefly, referring to FIGS. 1-3, there is shown a basket or filter 5 in which the pulp of the fruit will be accumulated after having been ground by cutting disk 9 equipped with blades 4.

The cutting disk is rotated by the central shaft or spindle of the motor 6, with the rotation speed of the disk depending upon the speed of the motor itself. Also mounted on the spindle 6 is a pair of ballbearings 8 allowing movement independent of the main shaft. Mounted onto ballbearings 8 is filter 5. The filter, by means of the ballbearings 8 rotates at a speed lower than that of the cutting disk 9. The differential rotational speed creates a rolling motion which distributes the load of pulp in the filter, thereby lessening the vibration of the machine. A mounting plate 3 is mounted on ballbearings 8 to receive the filter 5 which in turn is held fast by means of springs 10, thereby simplifying the dismounting of filter 5 for emptying and cleaning. Also mounted on shaft or spindle 6 is ballbearing 7 which serves as a support for the central shaft. Fins 12 are fixed to the mounting plate 3 for cooling the motor by means of equidistant perforations of the body of the motor 2.

Figure 4:
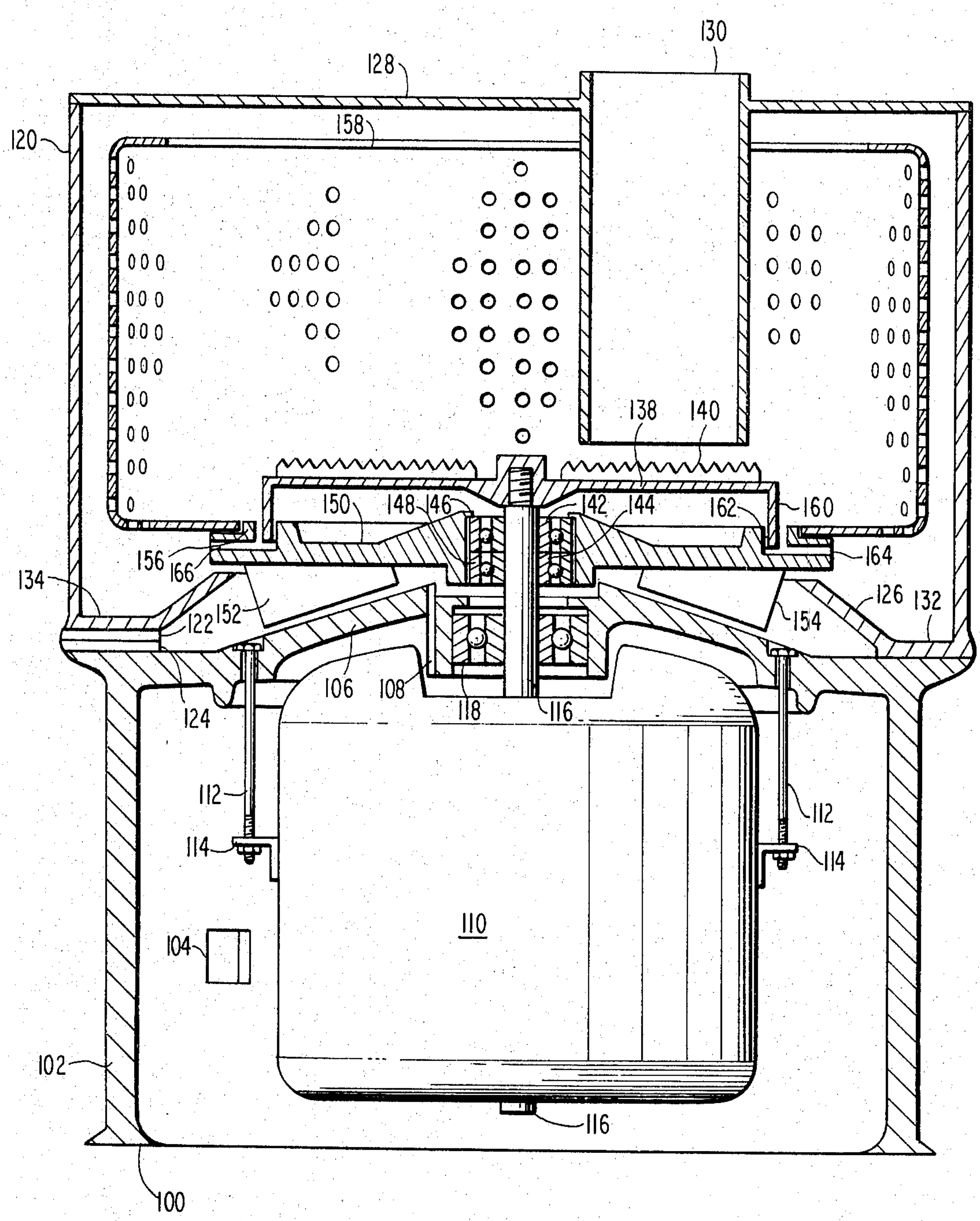
FIG. 4 is a sectional view showing a preferred embodiment of the invention.

As can be seen in the sectional view in FIG. 4, a preferred embodiment has a base 100 of substantially cylindical shape. Base 100 has side walls 102 having an air inlet port 104 and top wall 106 having a series of air outlets 108 one of which appears in FIG. 4. Housed within base 100 is motor 110. It will be apparent that air drawn in through air inlet 104 can cool motor 110 and be discharged through air outlets 108. Motor 110 is mounted on base 100 by bolts 112 and brackets 114. Motor 110 has a driven spindle 116 which is mounted on and passes through base 100 via ballbearing 118.

On top of base 100 is a cylindical housing 120. On the left hand side of FIG. 4 at the junction of housing 120 and base 100, it will be apparent that each of these two components has a radial groove 122 and 124 which mates with the groove of the other of the two components. These two mated grooves form an outlet channel so that the air which passes through outlet 108 can eventually be discharged to the atmosphere. A plurality of such pairs of grooves are provided spaced around the device for providing a plurality of outlets. Housing 120 also has an inward upwardly turned flange 120 which guides the air outward.

The apparatus is provided with a top cover 128 provided with a downward depending chute 130 for introducing the product to be comminuted and juiced. The juice product is collected in outer trough 132 of housing 120 for discharge through spigot 134. Mounted on threaded end 136 of spindle 116 is cutting disk 138 having a plurality of radially arranged upstanding blades or cutting surfaces 140. The cutting blades may be attached to the disk by any convenient means such as snap fit, welding and the like. It is also possible to have a disposable cutting disk mounted on the spindle. The threaded engagement of disk 138 with spindle 116 provides a positive rotation of disk 138 at the same angular speed as motor 110.

Between base 100 and cutting disk 138, inner races 142 and 144 of a pair of ballbearings are rigidly mounted for positive rotation on spindle 116. Outer races 146 and 148 are rigidly mounted in centrifuging disk 150. Thus, centrifuging disk 150 is free to rotate with respect to spindle 116. However, as will be apparent, the friction inherent in the ballbearings will cause centrifuging disk 150 to rotate when spindle 116 is rotated.

Assuming all components to be initially at rest, if motor 110 is energized cutting disk 138 will rotate at the rated angular speed of motor 110. As operation continues, centrifuging disk 150 begins to rotate and gradually accelerates until it rotates at substantially at the same speed as cutting disk 138. Accordingly, in order to introduce a differential between these two rotating speeds, radially aligned fins 152 and 154 are mounted on the bottom of centrifuging disk 150. It will be recalled that in operation, air passes from outlet 108 to the outlet formed by grooves 122 and 124. This radially moving air interferes with fins 152 and 154, thus slowing down the rotation of centrifuging disk 150 so that it rotates at a slower speed than cutting disk 138. A plurality of fins 152 (154), usually 4 to 6, are provided.

Centrifuging disk 150 is provided with an outer annular groove 156 onto which basket 158 can be placed and clipped as shown in the previous embodiments. Basket 158 can be clipped, screwed or in any other fashion apparent to those having ordinary skill in the art affixed to centrifuging disk 150. The basket 158 may be made of wire screen or mesh, or perforated metal or plastic. Cutting disk 138 has a cylindically shaped wall 160 depending from its outer circumference. Centrifuging disk 150 has an inner angular groove 162 into which wall 60 loosely fits. Radiating outward from groove 162 is a plurality of channels 164, 166 opening into trough 132.

In operation, the motor 110 is energized, causing the rotation of spindle 116 and cutting disk 138. Centrifuging disk 150 is also caused to rotate, along with its basket 158, but at a slower speed than cutting disk 138, due to the interaction of fins 152 and 154 with the out flowing cooling air.

When product to be juiced is introduced through chute 130, blades 140 on cutting disk 138 comminute the product to a juice and pulp product. The rotation of cutting disk 138 of course imparts a centrifugal force on the juice and pulp, with the pulp being thrown into basket 158, which due to its differing angular velocity with respect to cutter 138, causes an even distribution of the pulp around the basket 158. The juice can likewise be thrown outward into the basket 158 from which it is centrifuged to the inside of housing 120 and to trough 132. Alternatively, the juice runs down the outer portion of wall 160 into groove 162 of centrifuging disk 150 from which it is centrifuged out through channels 164 and 166 into trough 132.

By having depending wall 160 interfit with groove 162, the juice does not reach the ballbearings of centrifuging 150, thus preventing interference with their operation.

It will be apparent that the even distribution of pulp in basket 158 results in substantially non-vibrational rotation of the apparatus and effective centrifuging of the pulp to extract the juice therefrom. The result is a quieter, safer operation and a higher yield of juice.

I claim:

1. A juicer for separating a liquid portion of a product from its solid portions comprising:
   - a base,
   - a motor means mounted on the base for rotating a spindle,
   - a cutting disk rigidly mounted on the spindle for positive rotation thereby, means for introducing the product to be juiced to the cutting disk, a centrifuging disk mounted for independent rotation on the spindle between the motor and the cutting disk by means of ballbearings on the spindle, means mounted on the centrifuging disk for retaining the solid portions of the product and for allowing the liquid portion to pass radially outwardly, and a collection means surrounding the retaining means for collecting the liquid portion, whereby the motor means can rotate the cutting disk and the friction of the ballbearings will cause the centrifuging disk to rotate at a rotational speed different from that of the cutting disk to result in a relative rotational speed between the cutting disk and the centrifuging disk.

2. A juicer as claimed in claim 1 wherein two ballbearings are used to mount the centrifuging disk to increase the frictional engagement of the centrifuging disk with the spindle.

3. A juicer as claimed in claim 1 wherein the cutting disk has a cylindrically shaped wall depending from its outer circumference, and wherein the centrifuging disk has an annular groove in its top surface into which the depending wall of the cutting disk loosely fits and channels radiating from the annular groove to the outer circumference of the centrifuging disk, whereby the liquid portion of the product can travel down the depending wall of the cutting disk to the annular groove and then through the radiating channels of the centrifuging disk.

4. A juicer as claimed in any one of claims 1, 2, or 3 wherein the base has side walls and a top wall encasing the motor means, the top wall having the spindle passing therethrough, the side walls having air entry means and the top wall having air discharge means near the spindle, and wherein the centrifuging disk has fins mounted on its bottom, whereby air can pass through the base from the air entry means to the air discharge means and pass radially outward therefrom between the top of the base and the centrifuging disk, so that the radially moving air engages the fins to retard the rotational speed of the centrifuging disk.

* * * * *